United States Patent [19]

Hespelt et al.

[11] Patent Number: 5,157,698

[45] Date of Patent: Oct. 20, 1992

[54] METHOD FOR CLOCK PULSE SYNCHRONIZATION

[75] Inventors: Volker Hespelt; Thomas Alberty, both of Backnang, Fed. Rep. of Germany

[73] Assignee: ANT Nachrichtentechnik GmbH, Backnang, Fed. Rep. of Germany

[21] Appl. No.: 423,404

[22] Filed: Sep. 11, 1989

[30] Foreign Application Priority Data

Mar. 11, 1987 [DE] Fed. Rep. of Germany ....... 3707760

[51] Int. Cl.$^5$ ........................ H04L 7/00; H04L 27/06
[52] U.S. Cl. .......................................... 375/106; 375/94
[58] Field of Search ................ 375/118, 79, 97, 106, 375/94; 329/307, 361; 331/18; 455/246, 265

[56] References Cited

U.S. PATENT DOCUMENTS

| 3,745,255 | 7/1982 | Fletcher et al. | 455/260 X |
|---|---|---|---|
| 4,295,222 | 10/1981 | Van Uffelen | 375/106 |
| 4,336,500 | 6/1982 | Attwood | 331/12 X |
| 4,419,759 | 12/1983 | Poklemba | 375/97 |
| 4,455,663 | 6/1984 | Ragsdale | 375/106 X |
| 4,538,111 | 8/1985 | Giusto | 375/86 X |
| 4,726,043 | 2/1988 | Levesque | 375/96 |
| 4,847,880 | 7/1989 | Kamerman et al. | 375/106 X |
| 4,866,739 | 9/1989 | Agazzi et al. | 375/106 |

FOREIGN PATENT DOCUMENTS 3707760  6/1988  Fed. Rep. of Germany .

OTHER PUBLICATIONS

Dominique N. Godard, "Passband Timing Recovery In an All-Digital Modem Receiver", IEEE Transactions on Commmuniations, vol. Com-26, No. 5, May 1978, pp. 517–523.

Robert L. Bogusch et al., "Frequency-Selective Scintillation Effects and Decision Feedback . . . ", Proceedings of the IEEE, vol. 71, No. 6, Jun. 1983, pp. 754–767.

Primary Examiner—Benedict V. Safourek
Assistant Examiner—Tesfaldet Bocure
Attorney, Agent, or Firm—Spencer, Frank & Schneider

[57] ABSTRACT

A method of synchronizing clock pulses of a clock pulse generator used in a receiver of digital data transmissions. The received signal is demodulated by multiplying it in quadrature by an output signal of a carrier oscillator to obtain demodulated in-phase and quadrature components. The demodulated components are lowpass filtered to suppress harmonics of the carrier frequency and then bandpass filtered into two complex signals. The two complex signals are then linked together with a first linkage circuit to form a first control signal $u_{TI}$. The two complex signals are also linked together with a second linkage circuit to form a second control $u_{TR}$, wherein the two control signals can be interpretated as the real and imaginary components of a complex control signal $u_T = u_{TR} + ju_{TI}$. The two components are separately averaged and then evaluated to form an actuation signal having an actuation value $\delta$ representing an error in the timing of the error pulse generator relative to the received signal. The evaluation is based on the relationship $\bar{\phi} = \arctan \bar{u}_{TI}/\bar{u}_{TR}$, where $\bar{\phi}$ is the phase error in the clock pulse relative to the received signal.

15 Claims, 8 Drawing Sheets

METHOD FOR CLOCK PULSE SYNCHRONIZATION

BACKGROUND OF THE INVENTION

The invention relates to a method and to a circuit arrangement for implementing a synchronization method in a receiver of digital data transmissions including a timing error detector to which are fed in in-phase component and a quadrature component of a demodulated received signal produced from products of the received signal and an output signal of a carrier oscillator and lowpass filtering of the products to suppress harmonics. An output signal of the timing error detector serves as a control signal $u_{TI}$ for a clock pulse generator which produces clock pulses for sampling the received signal. The control signal $u_{TI}$ is produced by means of two bandpass filters in the timing error detector which convert the demodulated received signal into two respective complex signals which are in turn linked together by means of a linkage circuit in the timing error detector to form the control signal $u_{TI}$. The control signal $u_{TI}$ is used to actuate a timing error correction circuit of the clock pulse generator to synchronize the clock pulses with the received signal.

Such methods are known, for example from the article by Gardner, entitled "A BPSK/QPSK Timing-Error Detector for Sampled Receivers," in IEEE Com.-34, No. 5, May, 1986, pages 423-429.

In digital data transmission it is important for the receiver to derive the exact sampling moment from the received data. For this purpose, a timing error detector generates by way of non-linear operations an output signal $u_{TI}$ whose fundamental mode corresponds to the clock pulse frequency and whose zero passages permit derivation of the sampling moment.

FIG. 1 shows a clock pulse control loop as disclosed in the above Gardner article and as it is employed, for example, for QPSK (quadrature phase shift keyed) data transmission. The incoming received signal s(t) is demodulated in that the carrier signal is fed to it multiplicatively once directly and once with a phase shift of $-\pi/2$. By means of lowpass filters TP, the products of the double frequency are suppressed. The normal component, i.e. the real component x(t), and the quadrature component, i.e. the imaginary component y(t), of the demodulated input signal are obtained from the outputs of the lowpass filters and fed to a subsequent timing error detector TD. Its output signal $u_{TI}$ is fed via a loop filter (SF) to a timing error correction device TPK which actuates a sampling device A for sampling, for example, the non-demodulated or the demodulated input signal. Such sampling is necessary if the signals are to be processed in the receiver in a time discrete manner.

In FIG. 1, for example, sampling occurs before demodulation. However, such sampling could also be done at any other desired location, for example after demodulation or after lowpass filtering. It is here assumed that the output signal of the timing error detector is present as a sampled signal $u_{TI}(kT)$, where T is the symbol interval or the step length which, according to the relationship of $f_{Nyq} = \frac{1}{2}T$ is a function of the Nyquist frequency $f_{Nyq}$. The sampling phase of the sampler A present in the receiver is changed by way of loop filter SF and timing error correction circuit TPK until the sampled values at the output of the timing error detector average zero: $\bar{u}_{TI}(k \cdot T) = 0$, where k is an integer which numbers the clock pulses.

FIG. 2 shows the typical characteristic of a timing error detector. The sampling phase $\epsilon$, i.e. the deviation $\Delta t/T$ of the actual sampling moments from the correct sampling moments (in the case where transmitter and receiver clock pulse are coherent, $\epsilon = 0$) are plotted in the direction of the abscissa and the averages of $u_{TI}$ are plotted in the direction of the ordinate. For $\epsilon = 0$ and $\epsilon = \pm 0.5$, $\bar{u}_{TI} = 0$. The center $\epsilon = 0$ of this sinusoidal curve is stable while at $\epsilon = \pm 0.5$, synchronization may be labile, i.e. it is possible that the synchronization is caught at the labile point for a longer or shorter period of time, thus noticeably lengthening the synchronization time.

SUMMARY OF THE INVENTION

It is the object of the present invention to provide a method of the above-mentioned type which is able to substantially suppress the above-described getting-caught and permits much faster synchronization.

The solution is effected as follows: By means of a second linkage circuit in the timing error detector, the two complex signals from the bandpass filters are linked together to form a second control signal $u_{TR}$ in such a manner that the two control signals $u_{TR}$ and $u_{TI}$ can be interpreted as the real component and the imaginary component of a complex control value $u_T = u_{TR} + ju_{TI}$. The two control signals $\bar{u}_{TR}$ and $\bar{u}_{TI}$ are subjected to averaging. Thereafter, the thus averaged values $\bar{u}_{TR}$ and $\bar{u}_{TI}$ are evaluated by means of an evaluation circuit to form an actuation value $\delta$ which actuates the timing error correction circuit.

The method according to the invention has the advantage that the above-described getting-caught is substantially suppressed and thus synchronization can take place much faster. The additional costs for this are relatively low.

DESCRIPTION OF THE PREFERRED EMBODIMENTS

Figure 3:
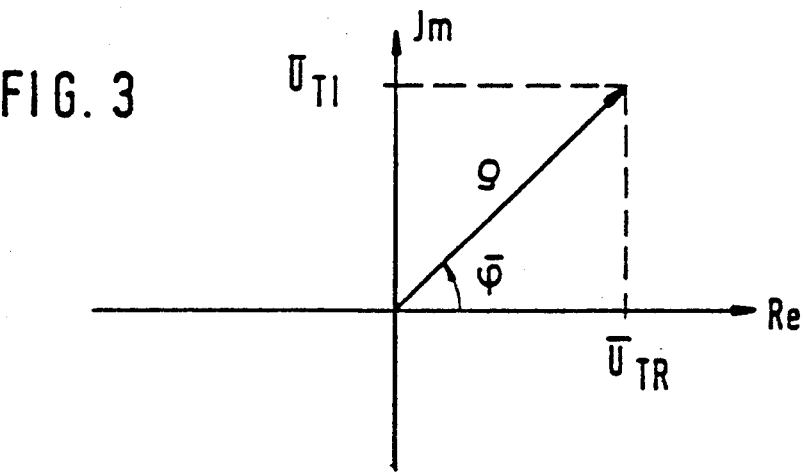
FIG. 3 is a plot of averages of real and imaginary components of a complex timing error detector output signal.

Applicant's German Application P 37 07 763 (corresponding to applicant's allowed copending U.S. application Ser. No. 07/423,391, filed Sept. 11, 1989) now U.S. Pat. No. 5,031,199 issued Jul. 9, 1991. discloses combined frequency and timing error detectors in which the timing error detector generates two output signals $u_{TR}$ and $u_{TI}$ which can be interpreted as the real and the imaginary component of a complex timing error detector output signal $u_T = u_{TR} + ju_{TI}$. Details of the timing error detector are described below. If one plots the average of $u_{TR}$ and $u_{TI}$ as the real component and the imaginary component in a complex plane, a complex vector of a length $\rho = \sqrt{\bar{u}_{TR}^2 + \bar{u}_{TI}^2}$ and the phase angle $\bar{\phi} = \arctan \bar{u}_{TI}/\bar{u}_{TR}$ results, see FIG. 3.

Figure 4:
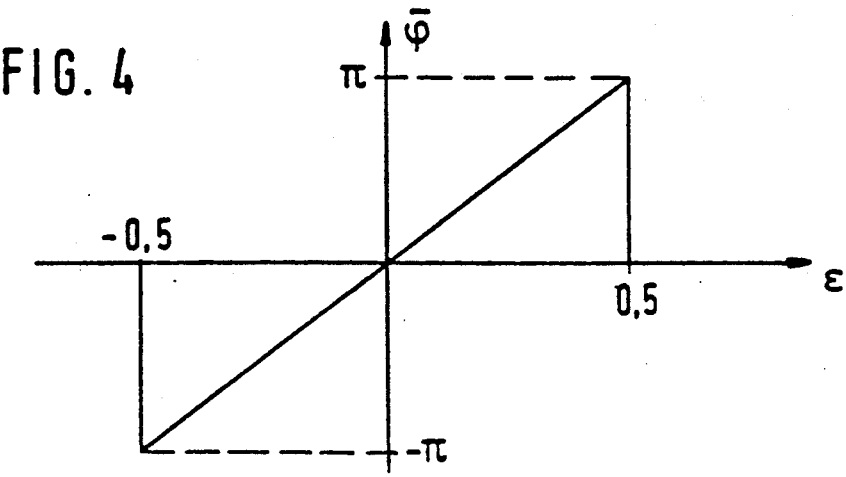
FIG. 4 is a plot of the phase angle of a complex timing error detector output vector as a function of the sampling phase.

The use of $\phi = \arctan u_{TI}/u_{TR}$ as the actuation signal for the subsequent timing error correction circuit leads to improved acquisition behavior. The relationship between $\epsilon$ and $\bar{\phi}$ is shown in FIG. 4.

The method according to the invention will now be described with reference to FIG. 5 which shows an arrangement according to the invention. The real component $u_{TR}$ and the imaginary component $u_{TI}$ of the clock pulse oscillation are generated with the aid of a timing error detector TD, as disclosed in the above identified German application and in the corresponding U.S. Pat. No. 5,031,197 and illustrated in FIGS. 5a, 5b and 5c as described below. As is illustrated in FIG. 5a, the timing error detector TD includes two bandpass filters BP+ and two combining or linkage circuits VTR and VTI. The two bandpass filters BP+ respectively bandpass filter the lowpass filtered demodulated in-phase component x and quadrature component y or a received signal, to obtain two respective complex signals $(rx)+j(iy)$ and $(ry)+(j(iy)$, where $j+\sqrt{-1}$, rx and ry are real components and ix and iy are imaginary components. The linkage circuits VTR and VTI link the two complex signals in different ways to produce the output signals $u_{TR}$ and $u_{TI}$ as respectively illustrated in FIGS. 5b and 5c. As shown in FIG. 5b, linkage circuit VTR squares the respective components rx, ry, ix and iy and then combines the squared components to obtain $u_{TR} = (rx)^2 + (iy)^2 - (ix)^2 - (iy)^2$, and as shown in FIG. 5c, multiples the components in pairs, to obtain the products (rx)(ix) and (ry)(iy), sums the products the and multiplies the sum by 2 to obtain $u_{TI}2\{(rx)(ix)+(ry)(iy)\}$.

The real component and imaginary component should be present either as samples $u_{TR}(k \cdot T)$, $u_{TI}(K \cdot T)$ or they are sampled at the sampling rate $f_S = 1/T$, with the sampling phase or, more precisely, its deviation, being assumed to be $\epsilon = \Delta t/T$. Such a sampling of the two output signals of timing error detector TD is shown in FIG. 5. The samples of the two components are then averaged over m clock pulses in average formers MW. In special cases, m=1, i.e. no averaging is possible. After an averaging time of m·T, the averages are fed to an evaluation circuit AS which feeds an adjustment or control information $\delta$ to the subsequent timing error correction circuit TPK. The latter, in turn, puts out the sampling clock pulse at a sampling phase corrected by $\delta$.

The function of evaluation circuit AS will be described with reference to FIGS. 7a-7f, 8a and 8b. These figures show several possibilities for evaluating the two averages.

Figure 7A:
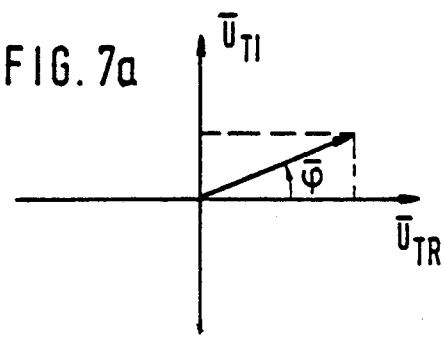
FIGS. 7a-7f, 8a and 8b are plots illustrating several ways of evaluating the averaged values $\bar{u}_{TR}$, $\bar{u}_{TI}$.
Figure 7B:
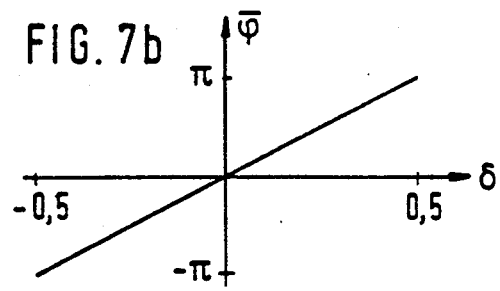

A first possible way is shown in FIGS. 7a and 7b. The phase $\bar{\phi} = \arctan \bar{u}_{TI}/\bar{u}_{TR}$ is formed from the two averages $\bar{u}_{TR}$ and $\bar{u}_{TI}$. A linear relationship of $\delta = 0.5 \cdot \bar{\phi}\pi$ exists between the phase $\bar{\phi}$ and $\delta$ as shown in FIG. 7b. The precise determination of phase $\bar{\phi}$ is somewhat complicated. It is simplified if regions are formed in the $\bar{u}_{TR}$, $\bar{u}_{TI}$ plane which are easily queried and fixed phase values $\phi_Q$ are then assigned to these regions.

Figure 7C:
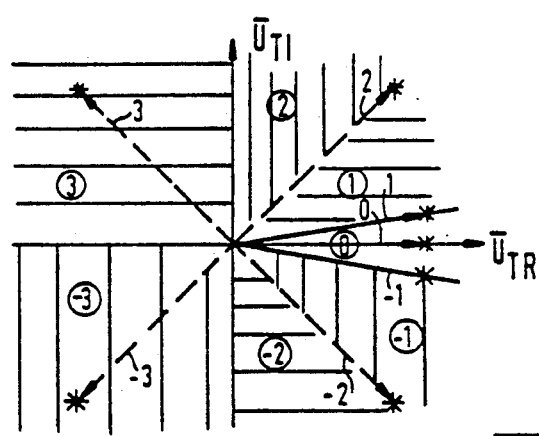
Figure 7D:
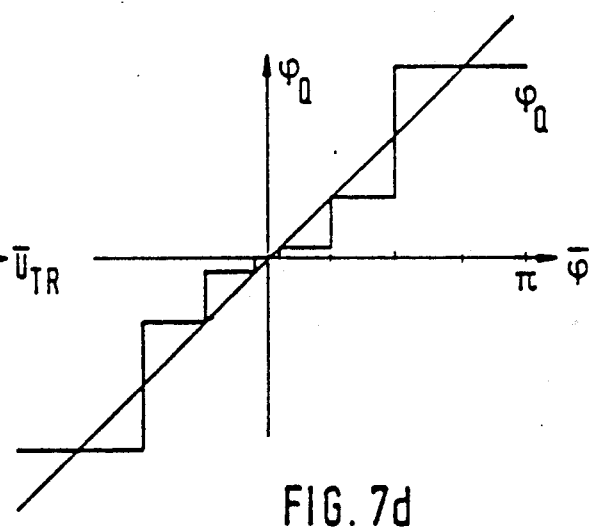

This second possible way is shown in FIGS. 7c and 7d. In FIG. 7c, a vector is assigned to each hatched region identified by encircled numerals, with the respective vector bearing the same numeral. The asterisks identify the tips of the respective vector. Thus each region has associated with it as $\phi_Q$ the phase of the corresponding vector. This corresponds to quantizing of $\bar{\phi}$ as shown in FIG. 7d. The linear relationship between $\delta$ and $\bar{\phi}$ according to FIG. 7a thus changes to a stepped curve as shown in FIG. 7d in which the following applies: $\delta = 0.5 \cdot \phi_Q/\pi$ and which shows the association of the regions with the fixed phase values of the table below. The division into regions shown in FIG. 7c is merely an example. Other types of regional divisions may of course also be realized; they differ in the magnitude of the expenditures for the query logic.

TABLE

| Phase angle region of $\bar{\phi}$ | $\phi_Q$ |
|---|---|
| $-\pi/16 \geq \bar{\phi} \leq +\pi/16$ | 0 |
| $\pi/16 < \bar{\phi} \leq \pi/4$ | $\pi/16$ |
| $\pi/4 < \bar{\phi} \leq \pi/2$ | $\pi/4$ |
| $\pi/2 < \bar{\phi} \leq \pi$ | $3\pi/4$ |
| $-\pi/16 > \bar{\phi} \geq -\pi/4$ | $-\pi/16$ |
| $-\pi/4 > \bar{\phi} \geq -\pi/2$ | $-\pi/4$ |
| $-\pi/2 > \bar{\phi} > -\pi$ | $-3\pi/4$ |

Figure 7E:
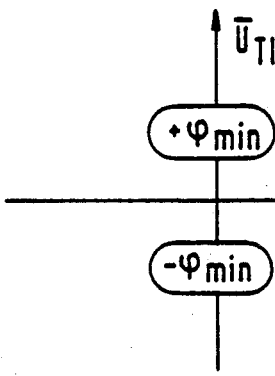
Figure 7F:
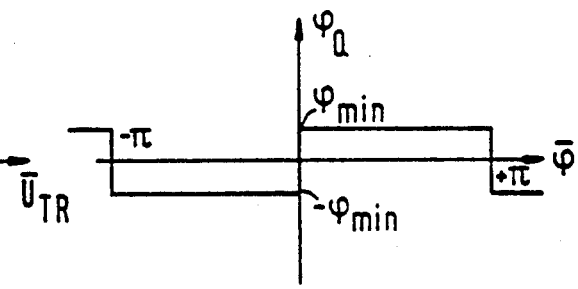
Figure 8A:
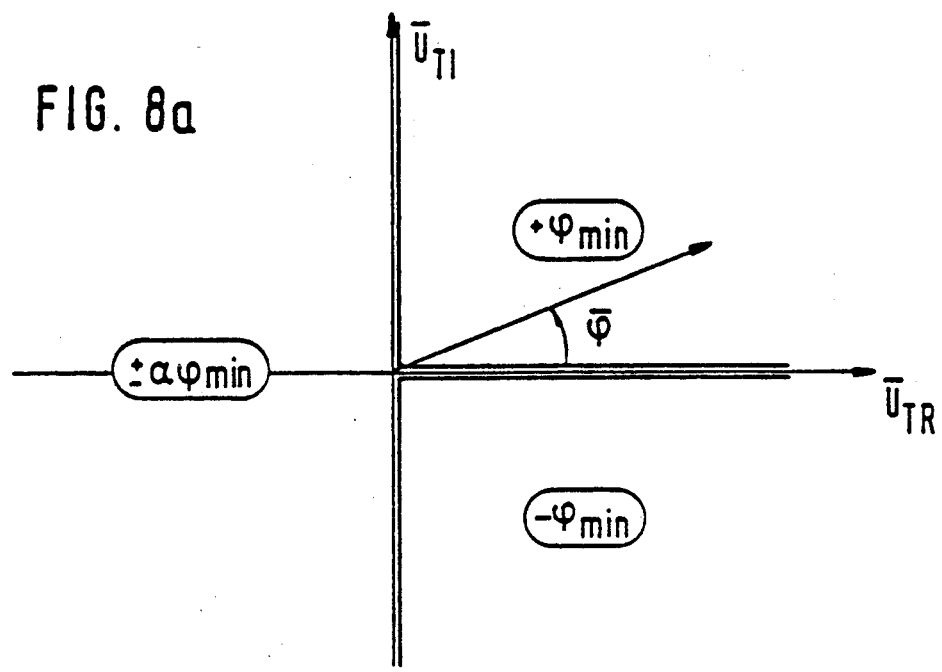
Figure 8B:
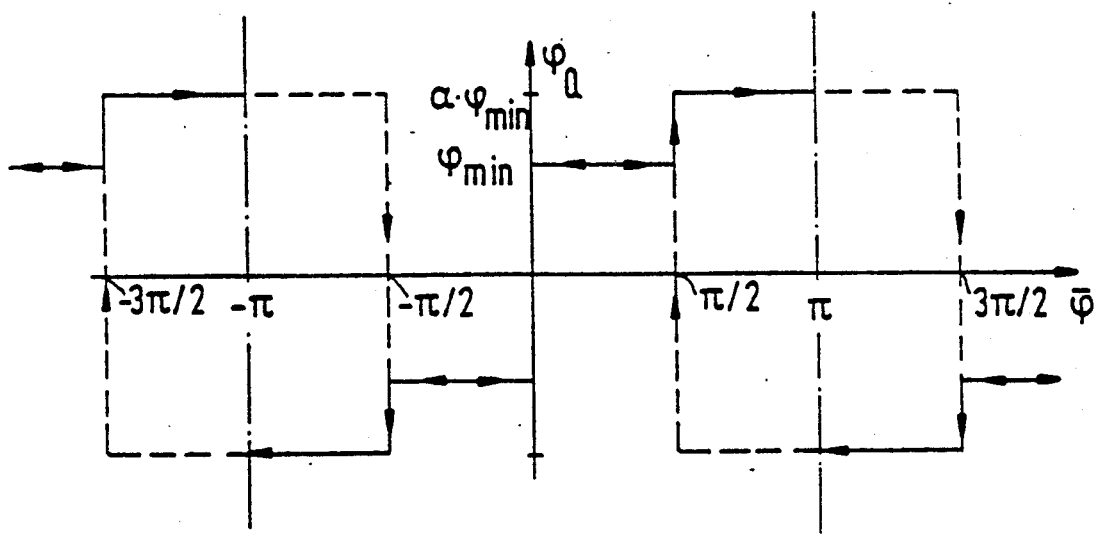

A third possible way shown in FIGS. 7e and 7f is very inexpensive. Here the quantized value $\phi_Q = \phi_{min}$ is fixed for positive phases $\bar{\phi}$ and the quantized value $\phi_Q = -\phi_{min}$ is fixed for negative phases $\bar{\phi}$, so that $\delta = \pm\delta_{min} = \pm 0.5 \cdot \phi_{min}/\pi$. Thus, in this manner of proceeding, only the sign of imaginary component $u_{TI}$ is evaluated and the actuation value $\delta$ is realized according to the equation $\delta = \delta_{min} \cdot \text{sign}(u_{TI})$. However, in this very simple procedure, the problem of the timing control being caught occurs again, namely at a sampling error of ±50%. The problem can be prevented by the evaluation shown in FIGS. 8a and 8b. The quantization characteristic according to FIG. 8b includes a hysteresis in phase regions $\pi/2 < \bar{\phi} < 3\phi/2$ and $-3\phi/2 < \bar{\phi} < -\pi/2$, respectively, while region $-\pi/2 \leq \bar{\phi} \leq \phi/2$ corresponds precisely to the corresponding region of the quantization characteristic of FIG. 7f. The use of a hysteresis is made possible, for example, in that the region of the complex $\bar{u}_{TR}$, $\bar{u}_{TI}$ plane is divided into three regions, namely the first quadrant, the fourth quadrant and a region covering the second and third quadrants, i.e. for negative $\bar{u}_{TR}$ values. A phase value assignment of $+\phi_{min}$ applies for the first quadrant and a phase value assignment of $-\phi_{min}$ for the fourth quadrant. The second and third quadrants receive phase value assignments of $\pm a \cdot \phi_{min}$, where $a \geq 1$. However, the assignments are made in such a way that if phase $\bar{\phi}$ is enlarged out of the first quadrant, the assignment will continue with a positive value $+\phi_{min}$ or $>+_{min}$ and only if the phase changes from the third into the fourth quadrant, is the phase value of $-\phi_{min}$ assigned which is applicable there. Conversely, if phase $\bar{\phi}$ becomes smaller and changes, for example, from the fourth quadrant to the third and second quadrants, the phase value of $-\phi_{min}$ assigned to the fourth quadrant is retained or reduced further ($\alpha > 1$). Only if a change should occur from the second to the first quadrant, is the new phase value $+\phi_{min}$ existing there assigned again. Thus, the actuation value $\delta$ is assigned according to the equation $\delta + 0.5$ sgn $(\bar{u}_{TI}) \cdot \phi_{min}/\pi$ if sgn $(\bar{u}_{TR})$ is positive, and according to the equation $\delta = 0.5$ sgn $(\bar{u}_{TIP}) \cdot \alpha \cdot \phi_{min}/\pi$ if sgn $(\bar{u}_{TR})$ is negative, wherein $\alpha \geq 1$ and sgn $(\bar{u}_{TIP})$ is the sign of uTI at a most recent time that $\bar{u}_{TR}$ was positive. The division into regions and the assignment of phase values can be seen in FIG. 8a. Of course, another regional division may be realized as well. The regional assignment shown here, however, is particularly inexpensive; it merely necessitates a query for the second and third quadrants whether the real component of the average of the timing error detector output signal is negative.

Figure 5:
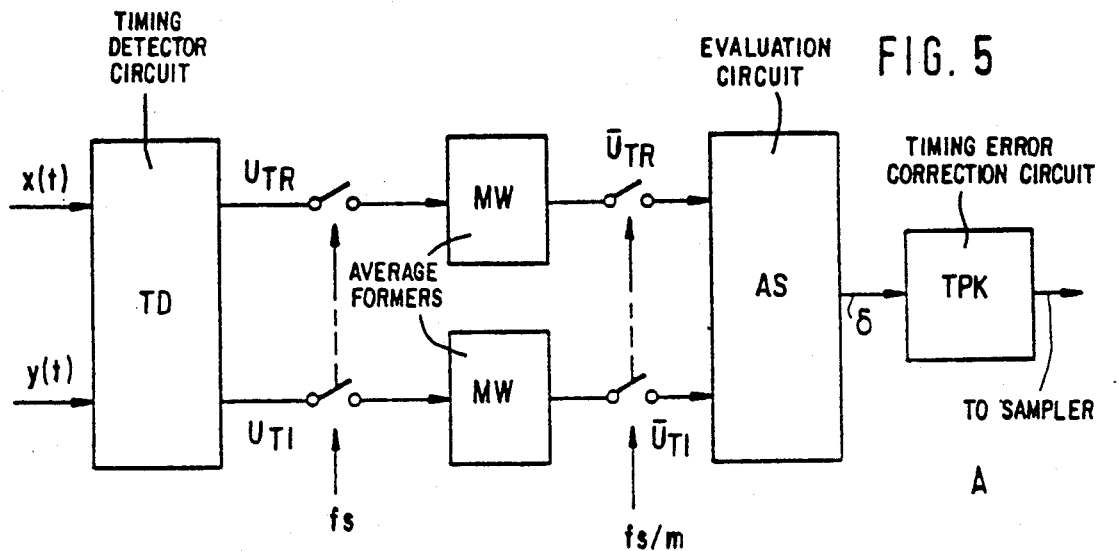
FIG. 5 is a block diagram of a circuit for carrying out a method of synchronizing clock pulses according to an embodiment of the invention.
Figure 5A:
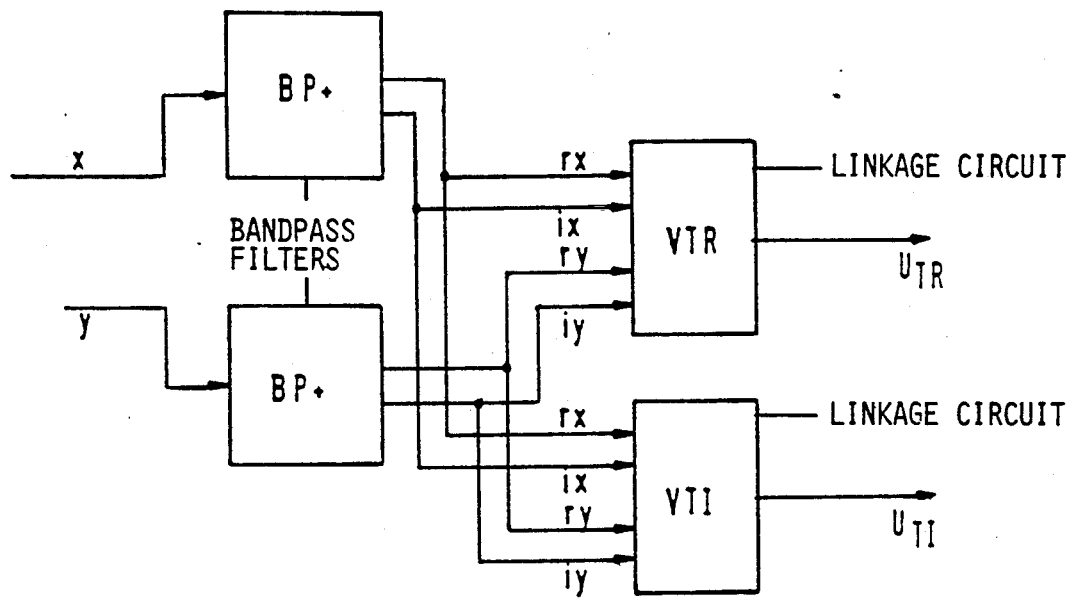
FIG. 5a is a block diagram of the timing error detection circuit.
Figure 5B:
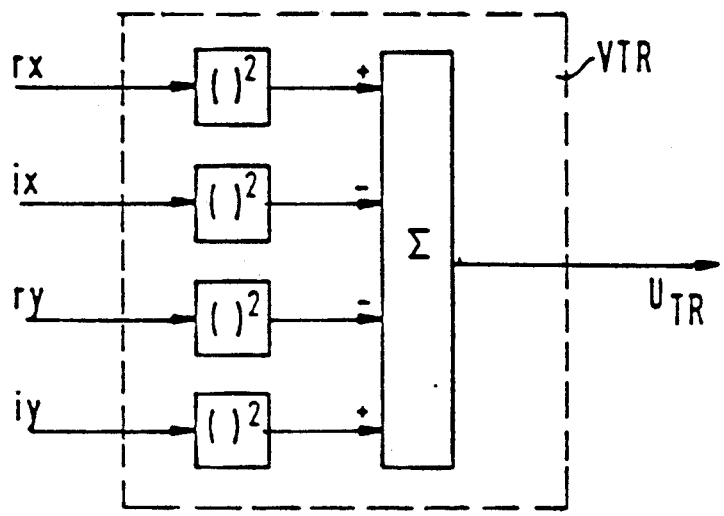
FIG. 5b in a block diagram of the linkage circuit, of the timing error detector circuit, for producing the real component $u_{TR}$ of the complex control value $u_T$.
Figure 5C:
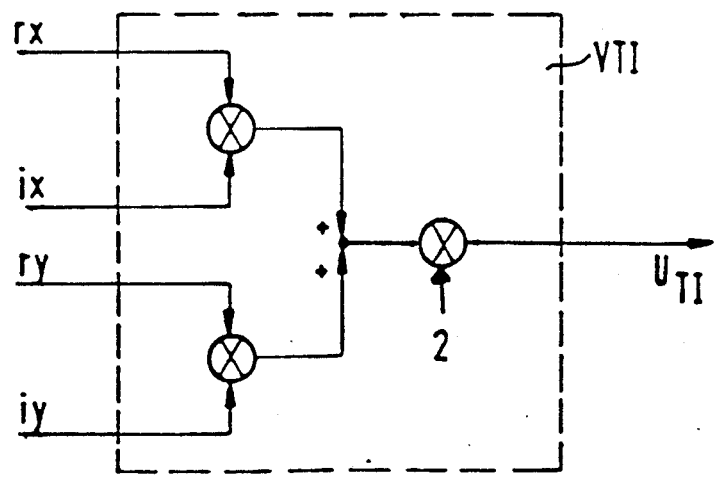
FIG. 5c is a block diagram of the linkage circuit, of the timing error detector circuit, for producing the imaginary component $u_{TI}$ of the complex control value $u_T$.

According to FIG. 5, the real and imaginary components of the complex output signal of timing error detector TD are sampled at intervals of a step length T, i.e. at the clock pulse rate $f_S = 1/T$.

Figure 6:
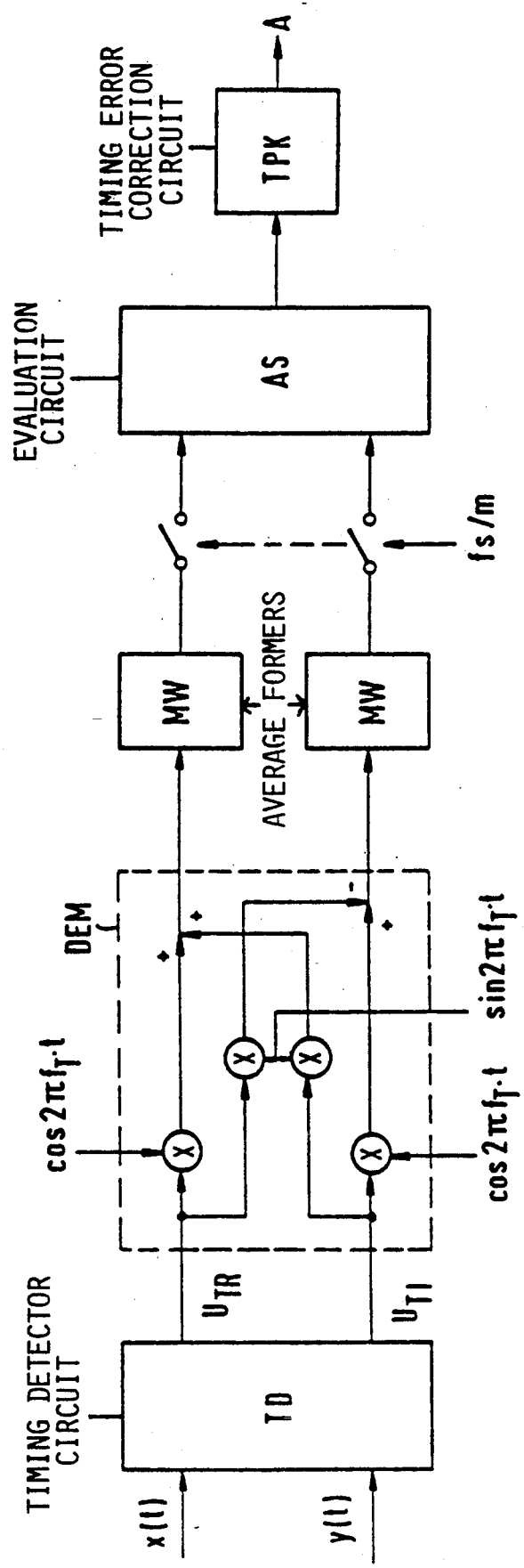
FIG. 6 is a block diagram of a circuit for carrying out a second embodiment of the method of the invention.

FIG. 6 shows an arrangement in which averaging is performed analogously, e.g. by means of lowpass filters. The sampling here does not take place until downstream of the average formers and at the reduced sampling rate $f_S/m$. The requirements for the subsequent analog-digital conversion are thus reduced as well. In contrast to FIG. 5, the block circuit diagram of FIG. 6 shows a demodulator module DEM included between timing error detector TD and average formers MW, with $f_T$ being the clock pulse frequency.

Basically, two possibilities exist to correct the sampling moment: firstly by way of a feedback arrangement and secondly by an arrangement for forward correction.

Figure 1:
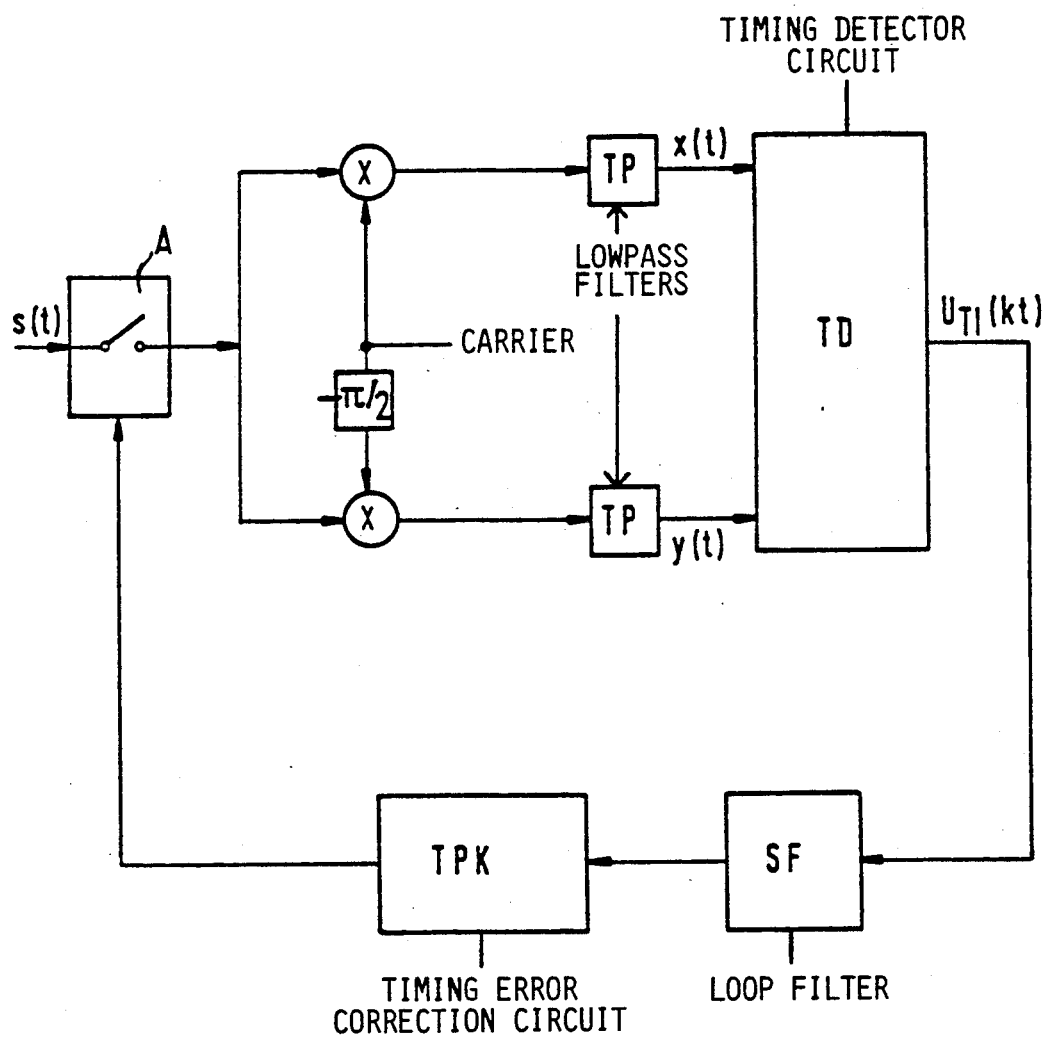
FIG. 1 is a block circuit diagram of a clock pulse control loop according to the prior art.
Figure 2:
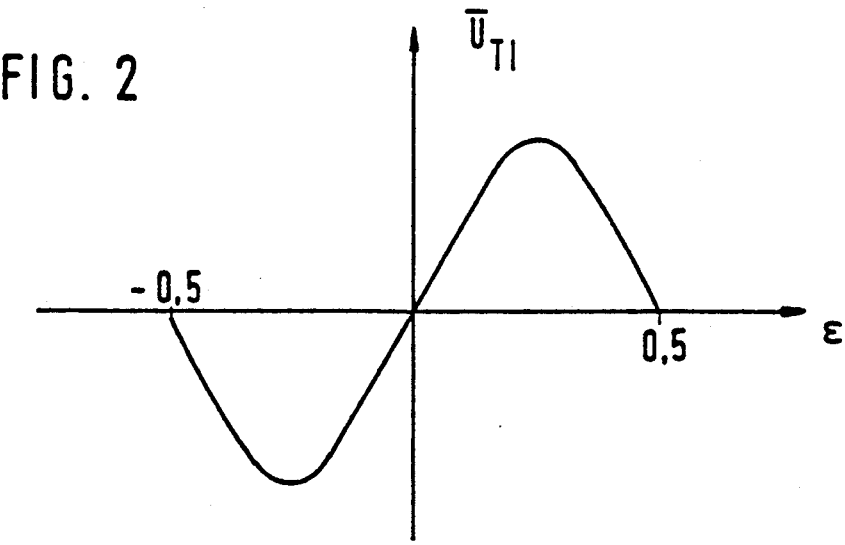
FIG. 2 shows a graph of a characteristic of an output signal of a timing error detector.

The first is shown in FIG. 1. The feedback arrangement is distinguished in that the timing error detector is influenced by the corrected sampling phase itself. If the sampling phase is correct, the output signal of the timing error detector will average zero.

Figure 9:
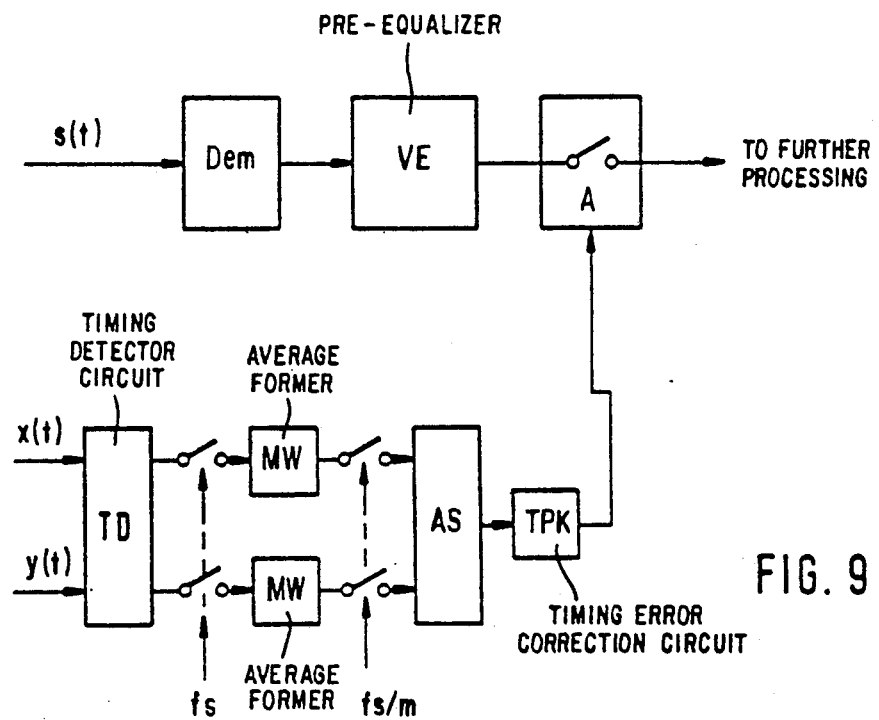
FIG. 9 illustrates a circuit arrangement for carrying out a still further embodiment of the method of the invention.

An arrangement for forward correction is shown in FIG. 9. Here, the output signal of timing error detector TD is influenced not by the correction of the sampling phase, rather the output signal of timing error correction circuit TPK is utilized only to set the sampling phase A in the data signal branch.

The arrangements of FIGS. 5 and 6 permit many possible combinations of averaging duration m·T and evaluation circuit AS.

Both arrangements and their combinations can be utilized for the timing control according to FIG. 1 and also for the forward timing control of FIG. 9.

In a feedback arrangement according to FIG. 1 it is favorable to select m to be small, e.g. m=1, and to perform only a rough quantization of the sampling phase in evaluation circuit AS in any of the ways described above with reference to FIGS. 7c-7f, 8a and 8b.

The costs for realization will then become correspondingly low.

For the forward correction of the clock pulse shown in FIG. 9, however, wherein the signal s(t) is applied to a demodulator Dem and a preequalizer VE before being sampled according to the output of timing error circuit TPK, it is necessary foe the evaluation circuit AS to furnish the most accurate possible linear estimate of the sampling phase. This is the case if, in the circuit arrangement according to FIG. 5 or 6, the averaging time m·T is large, i.e. m is high, and in evaluation circuit AS phase $\bar{\phi}$ is determined as accurately as possible, e.g. by effecting the evaluation according to the equation $\delta = 0.5 \cdot \bar{\phi}/\pi$, where $\bar{\phi} = $ arc tan $\bar{u}_{TI}/\bar{u}_{TR}$, as illustrated in FIGS. 7a and 7b.

We claim:

1. A method of synchronizing clock pulses of a clock pulse generator in a receiver of digital data transmissions with a received signal, the clock pulses to be applied in sampling the received signal, the method comprising the steps of:

multiplying the received signal in-phase and in quadrature by an output signal of a carrier oscillator to obtain demodulated in-phase and quadrature components of the received signal;

lowpass filtering the demodulated in-phase and quadrature components to suppress harmonics of the output signal of the carrier oscillator;

bandpass filtering the lowpass filtered in-phase and quadrature components, with respective first and second bandpass filters, into two respective complex signals;

linking the two complex signals together with a first linkage circuit to form a first control signal $u_{TI}$, linking the two complex signals together with a second linkage circuit to form a second control signal $u_{TR}$, the first and second control signals forming components of a complex timing error signal $u_T = u_{TR} + j u_{TI}$ where $\phi = $ arc tan $u_{TI}/u_{TR}$ represents the phase angle error in the synchronization of the clock pulses and the received signal;

averaging the first control signal $u_{TI}$ and averaging the second control signal $u_{TR}$ to obtain respective average values $\bar{u}_{TI}$ and $\bar{u}_{TR}$;

evaluating the average values $\bar{u}_{TI}$ and $\bar{u}_{TR}$ to form an actuation signal having an actuation value $\delta$ representing an error in the timing of the clock pulse generator relative to the received signal; and actuating a timing error correction circuit with the actuation signal to correct the timing of the pulses produced by the clock pulse generator to sample the received signal.

2. A method according to claim 1, further comprising the step of sampling the received signal before said step of multiplying or after said step of multiplying, or sampling said components of the complex signal $u_T$ after said step of linking, at a sampling rate $f_S = 1/T$ where T is a step duration of symbols of the received signal; and wherein said step of averaging includes the step of averaging the first control signal $u_{TI}$ and the second control signal $u_{TR}$ over a time m·T, where m is a positive integer ($m \geq 1$), to obtain components of a complex average value signal $\bar{u}_T = \bar{u}_{TR} = j \bar{u}_{TI}$, the method further including the step of sampling said components of the complex average value signal $\bar{u}_T$ at a sampling rate of $f_S/m$ before said step of evaluating the average values $\bar{u}_{TR}$ and $\bar{u}_{TI}$.

3. A method according to claim 2, further comprising the step of sampling the received signal upstream of said first and second bandpass filters using clock pulses which have been corrected by the timing error correction circuit, whereby the synchronizing is performed in a feedback loop.

4. A method according to claim 2, further comprising the steps of:

applying the received signal to a separate signal path prior to said step of bandpass filtering, and sampling the received signal in the separate path using clock pulses which have been corrected by the timing error correction circuit, whereby the timing of the synchronization is forward corrected.

5. A method according to claim 1, wherein said step of evaluating the average values includes the step of determining $\delta$ according to the equation $\delta = 0.5\bar{\phi}/\pi$ where $\bar{\phi} = \arctan \bar{u}_{TI}/\bar{u}_{TR}$.

6. A method according to claim 1, wherein said step of evaluating the average values includes the steps of defining a plurality of nonoverlapping phase angle regions, assigning respective fixed phase values to the phase angle regions, determining into which of the phase angle regions a phase of a complex vector $\bar{u}_T = \bar{u}_{TR} + j\bar{u}_{TI}$ given by $\bar{\phi} = \arctan \bar{u}_{TI}/\bar{u}_{TR}$ is to be found, and setting $\delta$ equal to $0.5 \cdot \phi_Q/\pi$ where $\phi_Q$ is the fixed phase value assigned to the phase angle region in which the phase of $\bar{u}_T$ is found.

7. A method according to claim 6, wherein the phase angle values $\phi_Q$ are assigned according to the following table:

TABLE

| Phase angle region of $\bar{\phi}$ | $\phi_Q$ |
|---|---|
| $-\pi/16 \geq \bar{\phi} \leq +\pi/16$ | 0 |
| $\pi/16 < \bar{\phi} \leq \pi/4$ | $\pi/16$ |
| $\pi/4 < \bar{\phi} \leq \pi/2$ | $\pi/4$ |
| $\pi/2 < \bar{\phi} \leq \pi$ | $3\pi/4$ |
| $-\pi/16 > \bar{\phi} \geq -\pi/4$ | $-\pi/16$ |
| $-\pi/4 > \bar{\phi} \geq -\pi/2$ | $-\pi/4$ |
| $-\pi/2 > \bar{\phi} > -\pi$ | $-3\pi/4$ |

8. A method according to claim 6, further comprising the step of averaging $\delta$ prior to said step of actuating the timing error correction circuit.

9. A method according to claim 6, further comprising the step of:

applying the received signal to a separate signal path prior to said step of bandpass filtering, and sampling the received signal in the separate path using clock pulses which have been corrected by the timing error correction circuit, whereby the timing of the synchronization is forward corrected.

10. A method according to claim 1, wherein said step of evaluating the average values includes the steps of fixing a minimum phase angle value $\phi_{min}$, determining the sign of the control value $\bar{u}_{TI}$ (sgn ($\bar{u}TI$)), and assigning the actuation value $\delta$ according the equation $\delta = 0.5$ sgn $(\bar{u}_{TI}) \cdot \phi_{min}/\pi$.

11. A method according to claim 1, wherein said step of evaluating the average values includes the steps of defining at least three regions, including a hysteresis region, in a complex plane, the complex plane having $\bar{u}_{TR}$ and $\bar{u}_{TI}$ measured along its real axis and its imaginary axis, respectively, the complex vector $\bar{u}_T = \bar{u}_{TR} + j\bar{u}_{TI}$ being defined in the plane; and selecting the actuation value $\delta$ according to a selected one of a plurality of predetermined functions of $\bar{u}_{TR}$ and $\bar{u}_{TI}$, for values of $\bar{u}_T$; in the first region of the complex plane, the selected one of the predetermined functions depending on which of the regions, exclusive of the hysteresis region, the most recent value of $\bar{u}_T$ outside of the hysteresis region was in.

12. A method according to claim 1, wherein said step of evaluating the average values includes the steps of: fixing a minimum phase angle value $\phi_{min}$, determining the signs sgn of the control values $\bar{u}_{TR}$ and $\bar{u}_{TI}$, assigning the actuation value $\delta$ according to the equation $\delta = 0.5$ sgn $(\bar{u}_{TI}) \cdot \phi_{min}/\pi$ if sgn $(\bar{u}_{TR})$ is positive, and assigning the actuation value $\delta$ according to the equation $\delta = 0.5$ sgn $(\bar{u}_{TIP}) \cdot \alpha \cdot \phi_{min}/\pi$ if sgn $(\bar{u}_{TR})$ is negative, wherein $\alpha \geq 1$ and sgn $(\bar{u}_{TIP})$ is the sign of $\bar{u}_{TI}$ at a most recent time that $\bar{u}_{TR}$ was positive.

13. A method according to claim 1, wherein said step of evaluating the average values includes the steps of defining a plurality of nonoverlapping phase angle regions, assigning respective fixed phase values to the phase angle regions, determining into which of the phase angle regions a phase of a complex vector $\bar{u}_T = \bar{u}_{TR} + j\bar{u}_{TI}$ given by $\bar{\phi} = \arctan \bar{u}_{TI}/\bar{u}_{TR}$ is to be found, and setting $\delta$ equal to $0.5 \cdot \phi_Q/\pi$ where $\phi$ is the fixed phase value assigned to the phase angle region in which the phase of $\bar{u}_T$ is found; and further comprising the step of sampling the received signal upstream of said first and second bandpass filters using clock pulses which have been corrected by the timing error correction circuit, whereby the synchronizing is performed in a feedback loop.

14. A method of synchronizing clock pulses of a clock pulse generator in a receiver of digital data transmissions with a received signal, the clock pulses to be applied in sampling the received signal, the method comprising the steps of:

multiplying the received signal in-phase and in quadrature by an output signal of a carrier oscillator to obtain demodulated in-phase and quadrature components of the received signal;

lowpass filtering the demodulated in-phase and quadrature components to suppress harmonics of the frequency of the output signal of the carrier oscillator;

converting the lowpass filtered in-phase and quadrature components into a first control signal $u_{TI}$ and a second control signal $u_{TR}$ and separately averaging $u_{TI}$ and $u_{TR}$ to obtain respective average values $\bar{u}_{TI}$ and $\bar{u}_{TR}$, said step of converting including the steps of bandpass filtering the lowpass filtered in-phase and quadrature components into two respective complex signals with respective first and second bandpass filters, linking the two complex signals together with a first linkage circuit to form the first control signal $u_{TI}$, and linking the two complex signals together with a second linkage circuit to form the second control signal $u_{TR}$, such that arc tan $\bar{u}_{TI}/\bar{u}_{TR}$ is equal to $\bar{\phi}$ where $\phi$ is the error in the phase angle of the clock pulses relative to the phase angle of the received signal;

evaluating the average values $\bar{u}_{TI}$ and $\bar{u}_{TR}$ to form an actuation signal having an actuation value $\delta$ representing an error in the timing of the clock pulse generator relative to the received signal; and actuating a timing error correction circuit with the actuation signal to correct the timing of the pulses used by the clock pulse generator to sample the received signal.

15. In a method of synchronizing clock pulses of a clock pulse generator in a receiver of digital data transmissions to a received signal, the clock pulses being applied in sampling the received signal, wherein:

the received signal is multiplied in-phase and in quadrature by an output signal of a carrier oscillator to obtain demodulated in-phase and quadrature components of the received signal, the demodulated in-phase and quadrature components are lowpass filtered to suppress harmonics of a carrier frequency of the output signal of the carrier oscillator, the lowpass filtered in-phase and quadrature components are respectively converted by first and second bandpass filters in a timing control detector into first and second complex signals, the first and second complex signals are linked by a first linkage circuit in the timing control detector so as to obtain a control signal which represents the imaginary part $u_{TI}$ of a complex value $u_{TR}+ju_{TI}$, the improvement comprising the further steps of:

linking the first and second complex signals together with a second linkage circuit in the timing control detector to form a second control signal having a value $u_{TR}$ which is the real part of the complex value $u_{TR}+ju_{TI}$, the values $u_{TI}$ and $u_{TR}$ of the first and second control signals being such that $\phi=\arctan u_{TI}/u_{TR}$ represents the phase angle error in the synchronization of the clock pulses and the received signal;

averaging the value $u_{TI}$ and averaging the value $u_{TR}$ to obtain respective average values $\bar{u}_{TI}$ and $\bar{u}_{TR}$;

evaluating the average values $\bar{u}_{TI}$ and $\bar{u}_{TR}$ to form a signal having a value $\delta$ representing an error in the timing of the clock pulse generator relative to the received signal; and actuating a timing error correction circuit with the signal having the value $\delta$ to correct the timing of the pulses used by the clock pulse generator to sample the received signal.

* * * * *